United States Patent [19]

Huang

[11] Patent Number: 5,694,111
[45] Date of Patent: Dec. 2, 1997

[54] TIRE PRESSURE INDICATOR

[76] Inventor: Tien-Tsai Huang, No. 4, Lane 30, Wu-Chuan St., Pan-Chiao City, Taipei Hsien, Taiwan

[21] Appl. No.: 773,000

[22] Filed: Dec. 23, 1996

[51] Int. Cl.[6] .................................................. B60C 23/00
[52] U.S. Cl. ........................ 340/442; 340/447; 340/445; 340/539; 73/146.5; 73/146.4
[58] Field of Search .............................. 340/447, 442, 340/445, 511, 539; 73/146.5, 146.8, 146.4; 116/34 R; 200/61.22

[56]  References Cited

U.S. PATENT DOCUMENTS

| | | | |
|---|---|---|---|
| 4,970,491 | 11/1990 | Saint et al. | 340/447 |
| 5,109,213 | 4/1992 | Williams | 340/447 |
| 5,285,189 | 2/1994 | Nowicki et al. | 340/447 |
| 5,289,161 | 2/1994 | Huang | 340/442 |
| 5,602,524 | 2/1997 | Mock et al. | 73/146.5 |

*Primary Examiner*—Jeffery Hofsass
*Assistant Examiner*—Anh La
*Attorney, Agent, or Firm*—Oblon, Spivak, McClelland, Maier & Neustadt, P.C.

[57]  ABSTRACT

A pressure gauge of a tire pressure indicator for a set of pneumatic tires of a vehicle includes a casing having a hollow adaptor to be attached to the pneumatic tire, an inlet and a finger piece for opening an inflating valve of the tire, and a signal generating device disposed in the casing. The signal generating device includes a pressure sensing unit which generates an analog voltage signal that varies in accordance with pressure imposed on the inlet, a signal converting unit for converting the analog voltage signal into a digital output signal, and an encoder unit for comparing the digital output signal of the signal converting unit with high pressure and low pressure limits of a predetermined normal operating pressure range, and for generating a coded signal which includes the digital output signal when the digital output signal is not within the operating pressure range.

11 Claims, 4 Drawing Sheets

TIRE PRESSURE INDICATOR

BACKGROUND OF THE INVENTION

1. Field of the Invention

The invention relates to a tire pressure indicator, more particularly to a tire pressure indicator capable of generating a signal whenever a tire is under- or over-inflated.

2. Description of the Related Art

U.S. Pat. No. 5,289,161 discloses a tire pressure indicator for a set of pneumatic tires of a vehicle. The tire pressure indicator comprises a plurality of pressure gauges and a receiver device. Each of the pressure gauges includes a casing which has a hollow adaptor to be attached to a respective one of the pneumatic tires, an inlet and a finger piece for opening an inflating valve of the pneumatic tire. Pushing means, such as a diaphragm, is disposed inside the casing adjacent to the inlet and is movable, in response to pressure imposed on the inlet, between a first position in which the pressure is below a predetermined low pressure limit and a second position in which the pressure is above a predetermined high pressure limit. A spring-loaded push rod is movably mounted inside the casing and is moved by the pushing means. A signal transmitting unit is provided inside the casing and has first and second switch devices which are controlled by the movement of the push rod. The first switch device activates the signal transmitting unit to transmit a first code unique to that gauge when the pushing means is in the first position. The second switch device activates the signal transmitting unit to transmit a second code unique to that gauge when the pushing means is in the second position. The receiver device receives the first and second codes transmitted by the signal transmitting unit of the pressure gauges, and includes first and second light emitting units. One of the first light emitting units is activated upon reception of the first code so as to indicate which one of the tires is under-inflated. One of the second light emitting units is activated upon reception of the second code so as to indicate which one of the tires is over-inflated.

Although the aforementioned tire pressure indicator is capable of informing the driver of the vehicle as to which one of the tires is under- or over-inflated, it suffers from the following drawbacks:

1. The pressure gauges of the tire pressure indicator comprise numerous components and are bulky.

2. The pressure gauges of the tire pressure indicator employ mechanical pressure sensing units that are susceptible to inaccurate movement and wearing, thereby adversely affecting precision of the tire pressure indicator.

SUMMARY OF THE INVENTION

Therefore, the object of the present invention is to provide a tire pressure indicator with an improved pressure gauge which is capable of overcoming the drawbacks associated with the aforementioned prior art.

Accordingly, the tire pressure indicator of this invention comprises:

- a plurality of pressure gauges respectively attached to the pneumatic tires of a vehicle, each of the pressure gauges including: a casing with a hollow adaptor adapted to be attached to the pneumatic tire, an inlet and a finger piece for opening an inflating valve of the pneumatic tire; and a signal generating device disposed in the casing, the signal generating device including
  - a pressure sensing unit which generates an analog voltage signal that varies in accordance with pressure imposed on the inlet,
  - a signal converting unit electrically connected to the pressure sensing unit for converting the analog voltage signal into a digital output signal,
  - an encoder unit electrically connected to the signal converting unit, the encoder unit comparing the digital output signal of the signal converting unit with high pressure and low pressure limits of a predetermined normal operating pressure range, the encoder unit generating a coded signal which includes the digital output signal and an identification code unique to that gauge when the digital output signal is not within the operating pressure range, and
  - a signal transmitter circuit electrically connected to the encoder unit for transmitting the coded signal from the encoder unit wirelessly; and
- a receiver device including a signal receiver circuit for receiving the coded signal transmitted by the signal generating device of the pressure gauges.

Preferably, the finger piece of the casing of each of the pressure gauges is tubular and has the inlet formed thereat. The pressure sensing unit of the signal generating device of each of the pressure gauges includes a semiconductor pressure sensor with a pressure port that extends into the finger piece.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
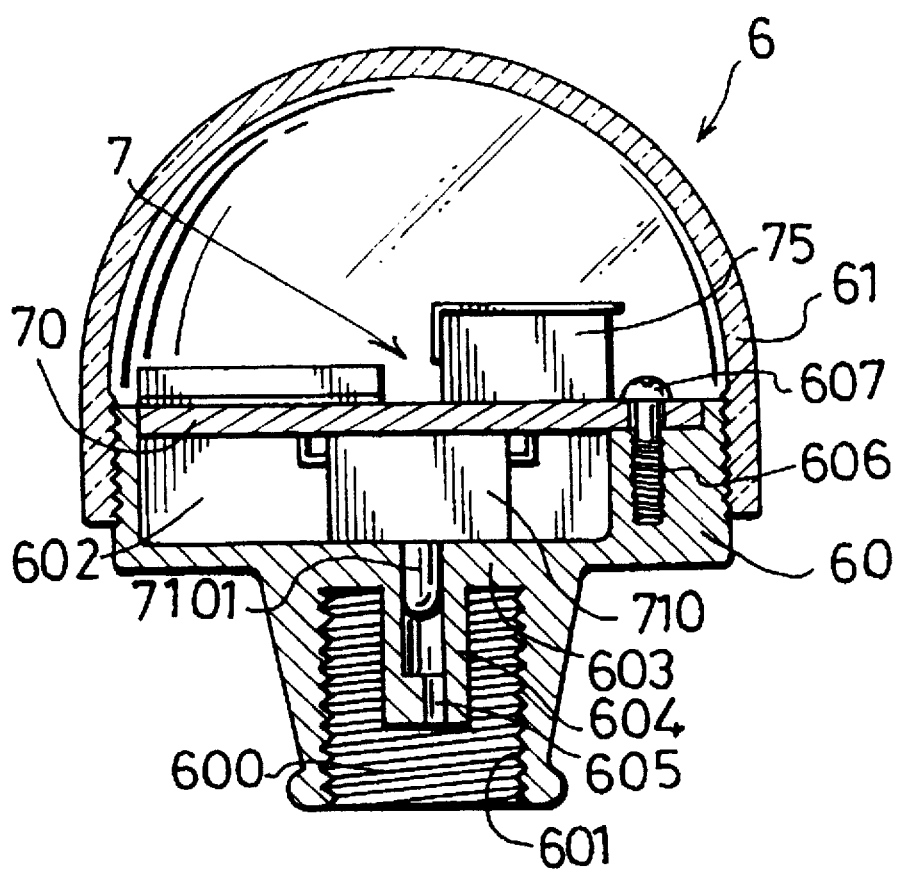
FIG. 1 is a sectional view of a pressure gauge of the preferred embodiment of a tire pressure indicator according to the present invention.

Referring to FIGS. 1 to 4, the preferred embodiment of a tire pressure indicator according to the present invention is shown to comprise a plurality of pressure gauges 6 (only one is shown) and a receiver device 8. Each of the pressure gauges 6 is adapted to be attached to a respective one of the pneumatic tires of a vehicle and comprises a casing having a hollow adaptor 60 and a cap 61, and a signal generating device 7 disposed in the casing.

The hollow adaptor 60 has a first open end 600 which is formed with an internal thread 601 so as to threadedly connect with an inflating valve of a pneumatic tire in a conventional manner. The cap 61 has a round closed end and an internally threaded open end which threadedly couples with a second open end 602 of the hollow adaptor 60. A transverse partition plate 603 extends adjacent to the first open end 600 of the adaptor 60 and is formed with a downwardly extending tubular finger piece 604 to open the inflating valve of the tire when the adaptor 60 is mounted on the latter. The finger piece 604 is formed with an inlet 605 to permit the entry of air from the tire into the hollow adaptor 60.

Figure 2:
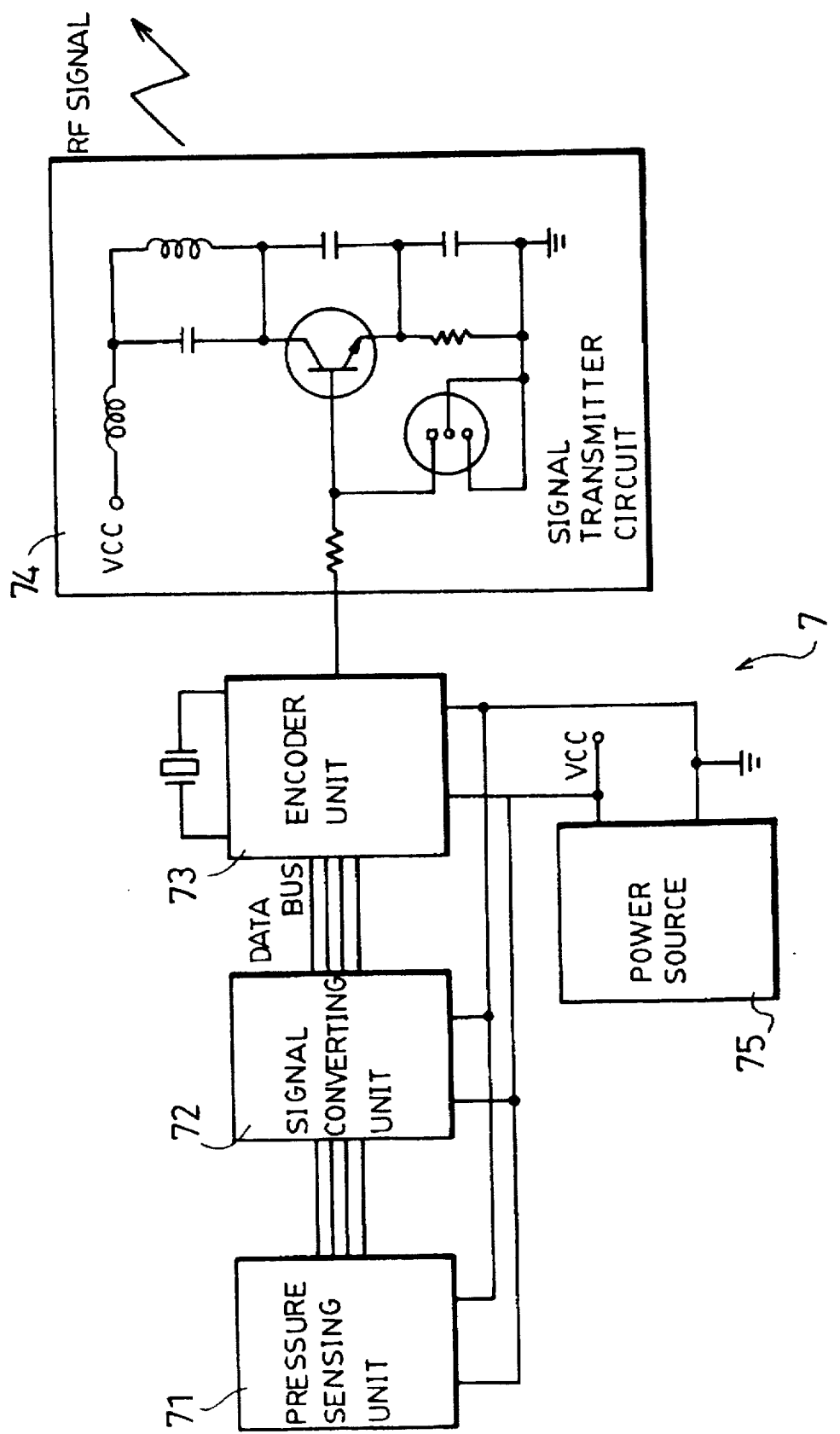
FIG. 2 is a schematic circuit block diagram of a signal generating device of the pressure gauge shown in FIG. 1.

The signal generating device 7 includes a circuit board 70 which is provided with several mounting holes 700 (only one is shown) to be aligned with screw sockets 606 formed in the hollow adaptor 60. Bolts 607 (only one is shown) extend through the mounting holes 700 of the circuit board 70 and engage the screw sockets 606 to fasten the circuit board 70 onto the hollow adaptor 60. As shown in FIGS. 1 and 2, the signal generating device 7 further includes a pressure sensing unit 71, a signal converting unit 72, an encoder unit 73, a signal transmitter circuit 74 and an electric power source 75 mounted on the circuit board 70.

Figure 3:
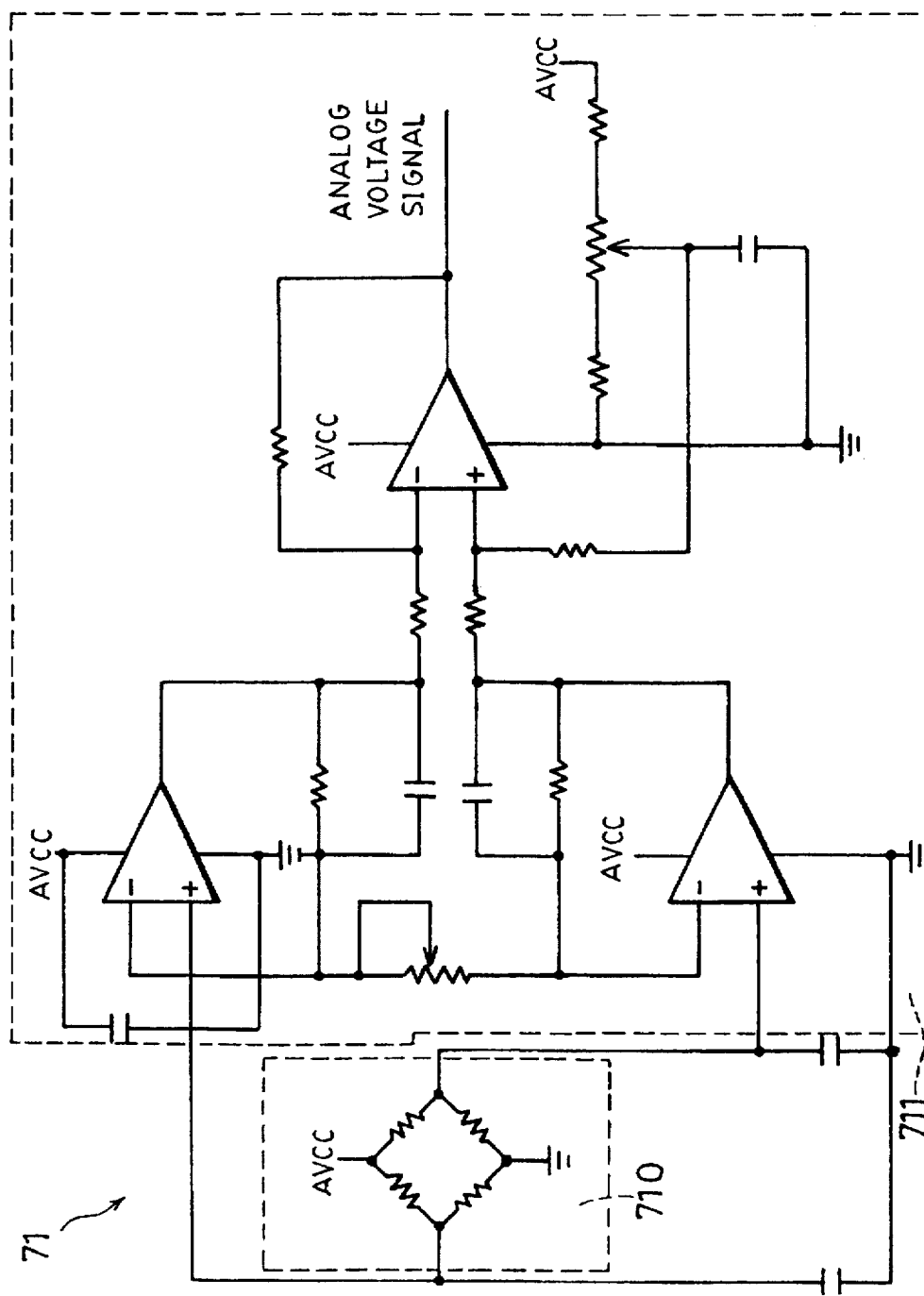
FIG. 3 is a schematic circuit diagram of a pressure sensing unit of the signal generating device.

Referring to FIG. 3, the pressure sensing unit 71 includes a pressure sensor 710 and an amplifier circuit 711. The pressure sensor 710 is a semiconductor pressure sensor, such as the ADP1 DIP type pressure sensor manufactured by Matsushita Electric Works under the brand name NAIS. As shown in FIG. 1, the pressure sensor 710 is mounted on a bottom side of the circuit board 70 and has a tubular pressure port 7101 which extends into the finger piece 604. The pressure sensor 710 generates an analog voltage signal which varies in accordance with the pressure entering into the pressure port 7101. The amplifier circuit 711 is electrically connected to the pressure sensor 710 and amplifies the analog voltage signal from the latter.

Referring once more to FIG. 2, the signal converting unit 72 is electrically connected to the pressure sensing unit 71 and serves to convert the analog voltage signal of the latter into a digital output signal. The encoder unit 73 is electrically connected to the signal converting unit 72 and receives the digital output signal of the latter. The encoder unit 73, which may be implemented using an Applications Specific Integrated Circuit (ASIC) or a microprocessor, compares the digital output signal of the signal converting unit 72 with low pressure and high pressure limits of a predetermined normal operating pressure range. The encoder unit 73 generates a coded signal which includes the digital output signal and an identification code unique to that gauge 6 when the digital output signal is not within the operating pressure range. No coded signal is generated when the digital output signal is between the low pressure and high pressure limits, indicating that the pressure entering into the pressure port 7101 is within the operating pressure range. The coded signal is preferably in the form of a digital pulse signal. The signal transmitter circuit 74 is electrically connected to the encoder unit 73 and receives the coded signal therefrom. The signal transmitter circuit 74 serves to transmit the coded signal wirelessly in the form of a radio frequency (RF) signal for reception by the receiver device 8.

Referring again to FIG. 1, the power source 75 may include two lithium button cells or two mercury button cells (only one is shown) connected in series and provided on a top side of the circuit board 70. The power source 75 supplies the electric power required by the signal generating device 7.

Figure 4:
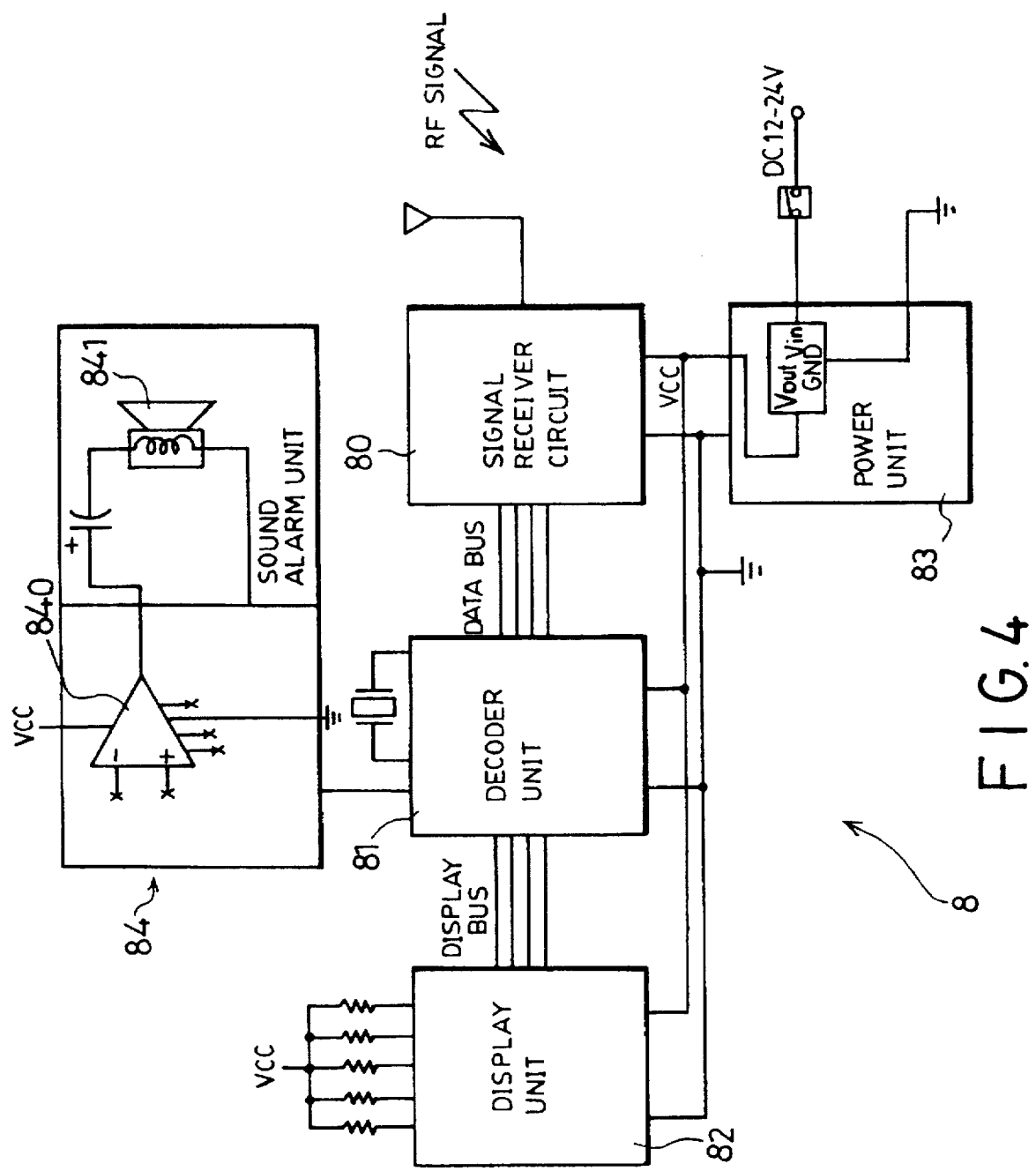
FIG. 4 is a schematic circuit block diagram of a receiver device of the preferred embodiment.

The receiver device 8, which receives the RF signal transmitted by the signal generating device 7 of the pressure gauges 6, may be built as a part of the instrument panel of the vehicle or as a separate device to be installed in the driver room of the vehicle. The receiver device 8 provides information to the driver concerning the status of the different tires of the vehicle. Referring to FIG. 4, the receiver device 8 includes a signal receiver circuit 80, a decoder unit 81 electrically connected to the signal receiver circuit 80, a display unit 82 electrically connected to the decoder unit 81, a power unit 83, and a sound alarm unit 84 electrically connected to the decoder unit 81.

The signal receiver circuit 80 receives and demodulates the RF signals transmitted by the pressure gauges 6 and provides the same to the decoder unit 81. The decoder unit 81 may be implemented using an Applications Specific Integrated Circuit (ASIC) or a microprocessor. The display unit 82, which may be a liquid crystal display or a light emitting diode (LED) display, is controlled by the decoder unit 81 so as to indicate thereon which one of the tires is under- or over-inflated and the pressure inside the under- or over-inflated one of the tires. The sound alarm unit 84 includes a sound amplifier circuit 840 and a loudspeaker 841 driven by the sound amplifier circuit 840. The sound alarm unit 84 is controlled by the decoder unit 81 so as to generate an audible alarm output for informing the driver of the vehicle as to which one of the tires is under- or over-inflated. The power unit 83 is preferably connected to a 12–24 volt DC battery of the vehicle and supplies the electric power required by the signal generating device 7.

It should be noted that it is not necessary for the receiver device 8 to have both the display unit 82 and the sound alarm unit 84. The receiver device 8 is operable even though only one of the display unit 82 and the sound alarm unit 84 is present.

The advantages of the tire pressure indicator of the present invention are as follows:

1. The pressure gauges of the tire pressure indicator comprise a relatively small number of components due to its use of a semiconductor pressure sensor instead of a mechanical pressure sensor.

2. As shown in FIG. 2, the pressure gauges of the tire pressure indicator are relatively small due to the smaller number of components that are in use.

3. Since the pressure gauges of the tire pressure indicator employ a semiconductor pressure sensor instead of a mechanical pressure sensor, the drawbacks of inaccurate movement and wearing of mechanical parts can be obviated to result in a highly precise tire pressure indicator.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A tire pressure indicator for a set of pneumatic tires of a vehicle, comprising:

a plurality of pressure gauges respectively attached to the pneumatic tires, each of said pressure gauges including:
  a casing with a hollow adaptor adapted to be attached to the pneumatic tire, an inlet and a finger piece for opening an inflating valve of the pneumatic tire; and a signal generating device disposed in said casing, said signal generating device including
  a pressure sensing unit which generates an analog voltage signal that varies in accordance with pressure imposed on said inlet,
  a signal converting unit electrically connected to said pressure sensing unit for converting the analog voltage signal into a digital output signal,
  an encoder unit electrically connected to said signal converting unit, said encoder unit comparing the digital output signal of said signal converting unit with high pressure and low pressure limits of a predetermined normal operating pressure range, said encoder unit generating a coded signal which includes the digital output signal and an identification code unique to that gauge when the digital output signal is not within the operating pressure range, and a signal transmitter circuit electrically connected to said encoder unit for transmitting the coded signal from said encoder unit wirelessly; and a receiver device including a signal receiver circuit for receiving the coded signal transmitted by said signal generating device of said pressure gauges.

2. The tire pressure indicator as claimed in claim 1, wherein said receiver device further includes a decoder unit electrically connected to said signal receiver circuit so as to receive the coded signal therefrom, and a display unit electrically connected to said decoder unit and controlled by said decoder unit so as to indicate thereon which one of the pneumatic tires is under- or over-inflated and the pressure inside the under- or over-inflated one of the pneumatic tires.

3. The tire pressure indicator as claimed in claim 2, wherein the display unit includes a liquid crystal display.

4. The tire pressure indicator as claimed in claim 2, wherein the display unit includes a diode display.

5. The tire pressure indicator as claimed in claim 1, wherein said receiver device further includes a decoder unit electrically connected to said signal receiver circuit so as to receive the coded signal therefrom, and a sound alarm unit electrically connected to said decoder unit and controlled by said decoder unit so as to generate an audible alarm output.

6. The tire pressure indicator as claimed in claim 1, wherein said finger piece of said casing of each of said pressure gauges is tubular and has said inlet formed thereat, said pressure sensing unit of said signal generating device of each of said pressure gauges including a semiconductor pressure sensor with a pressure port that extends into said finger piece.

7. The tire pressure indicator as claimed in claim 6, wherein said signal generating device of each of said pressure gauges further includes a circuit board which is mounted inside said casing above said finger piece and which has said pressure sensing unit, said signal converting unit and said encoder unit mounted thereon.

8. A pressure gauge for a pneumatic tire, comprising:

a casing having a hollow adaptor to be attached to the pneumatic tire, an inlet and a finger piece for opening an inflating valve of the pneumatic tire; and a signal generating device disposed in said casing and including a pressure sensing unit which generates an analog voltage signal that varies in accordance with pressure imposed on said inlet, a signal converting unit electrically connected to said pressure sensing unit for converting the analog voltage signal into a digital output signal, and an encoder unit electrically connected to said signal converting unit, said encoder unit comparing the digital output signal of said signal converting unit with high pressure and low pressure limits of a predetermined normal operating pressure range, said encoder unit generating a coded signal which includes the digital output signal when the digital output signal is not within the operating pressure range.

9. The pressure gauge as claimed in claim 8, wherein said signal generating device further includes a signal transmitter circuit electrically connected to said encoder unit for transmitting the coded signal from said encoder unit wirelessly.

10. The pressure gauge as claimed in claim 8, wherein said finger piece is tubular and has said inlet formed thereat, said pressure sensing unit including a semiconductor pressure sensor with a pressure port that extends into said finger piece.

11. The pressure gauge as claimed in claim 10, wherein said signal generating device further includes a circuit board which is mounted inside said casing above said finger piece and which has said pressure sensing unit, said signal converting unit and said encoder unit mounted thereon.

* * * * *